No. 768,215.

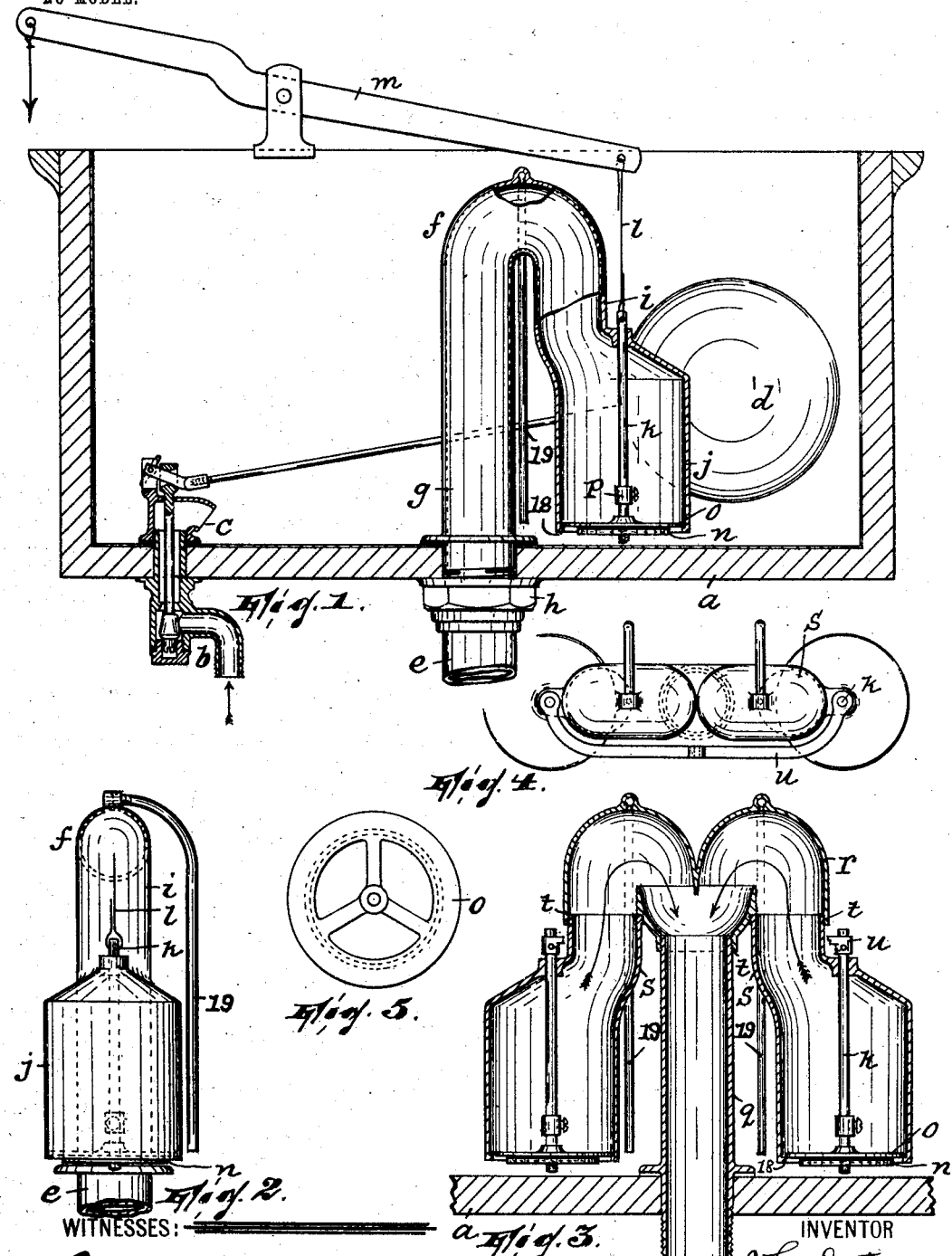

Patented August 23, 1904.

UNITED STATES PATENT OFFICE.

JOHN DENTON, OF PATERSON, NEW JERSEY.

FLUSHING APPARATUS.

SPECIFICATION forming part of Letters Patent No. 768,215, dated August 23, 1904.

Application filed April 25, 1903. Serial No. 154,301. (No model.)

*To all whom it may concern:*

Be it known that I, JOHN DENTON, a citizen of the United States, residing in Paterson, in the county of Passaic and State of New Jersey, have invented certain new and useful Improvements in Flushing Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to flushing apparatus for water-closets or the like; and it has reference particularly to that class of apparatus of this nature in which the flushing is effected through the medium of a tank and siphon.

The invention consists in an improved siphon-flushing apparatus of the kind in which the siphon is started by the lifting of a body of water over into the long leg of the siphon.

In the accompanying drawings, Figure 1 is a view of the apparatus, showing the tank in section and the siphon partly in section and partly in front elevation. Fig. 2 is a side view of the siphon shown in Fig. 1. Fig. 3 is a view in vertical section of what I term a "compound" or "twin" siphon of the general nature of that illustrated in Fig. 1. Fig. 4 is a top plan view of what is illustrated in Fig. 3, and Fig. 5 illustrates a detail of a certain starting means for the apparatus shown in either Fig. 1 or Fig. 3.

In said drawings, $a$ designates the tank; $b$, the supply-pipe; $c$, the valve controlling the flow into the tank from said supply-pipe; $d$, the float controlling said valve, and $e$ the discharge or flushing pipe.

Referring first to Fig. 1, $f$ designates a siphon whose long leg $g$ extends through the bottom of the tank and is thereupon coupled with the pipe $e$, as by a nut $h$ or in any other suitable manner. Its short leg $i$ has its free or lower end preferably formed as a relatively enlarged chamber $j$, open at the bottom. This chamber is arranged, relatively to the upper portion of the pipe, eccentrically in such manner that its central vertical axis is exterior to said upper portion.

$k$ designates a vertical rod which is disposed coincident with said vertical central axis of chamber $j$ and which projects through the top of said chamber, being connected at its upper end by a suitable coupling $l$ with an actuating-lever $m$, fulcrumed on the tank. This rod forms the stem of the siphon-starting means, said means comprising, with the rod, a disk $n$, fixed on the rod, and a skeleton valve $o$, arranged to slide on the rod between disk $n$ and an adjustable collar $p$.

Referring now to what is shown in Fig. 3, the long leg $q$ of the siphon carries at its upper end a two-way tubular casting $r$, each member of which has attached to it the other or short leg $s$ of the siphon. The joints between the parts mentioned are preferably in the form of threading, as at $t$. Each short leg $s$ of the siphon, including its internal mechanism, is in every respect exactly like the short leg of the siphon already described, so further description is unnecessary. The upper ends of the rods for the starting devices are connected by a stirrup $u$, which may be connected in any suitable manner to the starting-lever $m$ or its equivalent.

19 designates a tube or tubes communicating with the siphon at the top thereof and extending downwardly, terminating in coincidence with the plane of the intake or intakes of the siphon, its function being to prevent the gurgling sound which will occur when the level of the water reaches said plane.

The operation of this apparatus may be described as follows: The flushing is effected by moving lever $m$ so as to lift rod or rods $k$ and the parts carried thereby. The effect of this is to lift the bulk of the body of water contained in the short leg or legs of the siphon over the bend or bends in the siphon, thus starting the siphoning action. Upon the falling of that portion of the water which passes over the bend and the consequent relative reduction of pressure in the long leg of the siphon the water in the tank is made to follow the initial body of water over the bend or bends in the siphon. This is permitted owing to the fact that valve or valves $o$ are movable upwardly from plate or plates $n$, though not downwardly past the same. The lever $m$ has been meantime released, so that upon the completion of the siphoning action the parts of the starting means resume their initial or normal positions. The tank being flushed, the lowering of the level therein effects the automatic opening of valve $c$, so that the tank is refilled in the usual manner. Upon the refilling valve $o$ lifts slightly to permit the water to occupy chamber $j$, which is thus recharged, being thereupon ready for a repetition of the operation.

The stop $p$ is adapted upon raising the rod $k$ to its uppermost limit to seal the top of the chamber $j$ where the rod penetrates the same.

In an apparatus of the kind above described, and especially if the siphon stands relatively high in the tank, the apparatus is subject to the danger of overflows if the valve $c$ should leak. This is due to the fact that although the height of the water outside of the siphon may be greater at any time after the valve $c$ is supposed to cut off and does not than the height of the water inside the siphon, there is no assurance that the valve $o$ will always in practical working give way under the difference in pressure thus produced and permit the water to have exit by way of the siphon. I therefore provide a stop 18, formed as an internal bead or flange at the lower end of the chamber $j$, which is adapted to check the valve $o$ short of the lowermost limit of the piston which the disk $n$ constitutes, so that when the parts are in their rest position valve $o$ will be spaced from the piston, and so afford an opening which will permit the apparatus to siphon itself automatically should valve $c$ leak.

Having thus fully described my invention, what I claim as new, and desire to secure by Letters Patent, is—

In a flushing apparatus, the combination of a reservoir, a supply therefor, a siphon constituting the discharge for said reservoir, means, located in the short leg of the siphon, for moving a part of the liquid in said reservoir over the bend in the siphon whereby to start the siphon, said means comprising a piston movable in and longitudinally of said short leg and having its rest or starting position at one end thereof and a valve opening in the direction in which said piston moves to start the siphon, and means, located at the rest position of the piston, for limiting the movement of the valve short of that of the piston as the latter assumes its rest position so as to normally hold open the communication between the tank and the siphon, substantially as described.

In testimony that I claim the foregoing I have hereunto set my hand this 21st day of April, 1903.

JOHN DENTON.

Witnesses:
    JOHN W. STEWARD,
    ROBERT J. POLLITT.